United States Patent [19]

Lindsay

[11] 4,151,966
[45] May 1, 1979

[54] FISHING LINE RETRIEVAL AND DISPENSING DEVICE

[76] Inventor: Patrick J. Lindsay, 311 S. 5th St., Santa Paula, Calif. 93060

[21] Appl. No.: 819,226

[22] Filed: Jul. 27, 1977

[51] Int. Cl.² .......................................... B65H 17/52
[52] U.S. Cl. .............................. 242/106; 242/84.1 R
[58] Field of Search ............ 242/106, 84.1 R, 129.51, 242/129.5; 43/20, 22, 25, 25.2

[56] References Cited

U.S. PATENT DOCUMENTS

| 2,848,778 | 8/1958 | Plummer | 242/84.1 R |
| 3,506,213 | 4/1970 | Young | 242/84.1 R |
| 3,647,155 | 3/1972 | Jorgenson | 242/106 |
| 3,950,881 | 4/1976 | Hoys | 43/25 |

Primary Examiner—Edward J. McCarthy
Attorney, Agent, or Firm—Kenneth J. Hovet

[57] ABSTRACT

A device for mounting a fishing line spool wherein line may be fed directly from the spool to a fishing reel or vice versa without dismantling the reel from a fishing pole. The device is clamped to a fishing rod and is provided with a housing and shaft for mounting a spool of line. A crank and gear assembly is provided to allow the retrieval of line directly from the reel. Similarly, the crank may be disengaged from the shaft so the shaft will rotate freely while line may be drawn from the spool to the reel.

9 Claims, 7 Drawing Figures

FISHING LINE RETRIEVAL AND DISPENSING DEVICE

BACKGROUND OF THE INVENTION

1. Field of the Invention

The present invnetion relates to fishing equipment and, more particularly, to a device for dispensing and retrieving fishing line directly to and from a fishing reel.

2. Description of the Prior Art

Uniformly feeding and removing fishing line to and from a fishing reel has heretofore been a cumbersome procedure and presented a variety of problems. When removing fresh line from a spool, one must draw the line tangentially from the spool perpendicular to the axis of rotation or the line will twist and/or knot. The same is true when removing old line from a fishing reel —although in this case, it is also important to evenly and uniformly wind the line on an empty spool for satisfactory storage.

It has been common in the prior art to loosely nail a spool of fishing line to an upright support and wind the line onto a reel. This is clearly an unwieldy and cumbersome technique especially if the technique is carried out with the reel remaining on the fishing pole. An alternative procedure is simply to have one person hold the spool of line and allow it to rotate while another person cranks the fishing reel to draw the line onto the reel.

SUMMARY OF THE INVENTION

The present invention presents a versatile device which greatly facilitates the dispensation and retrieval of fishing line to and from a fishing reel. The device requires only a single individual for operation and eliminates the necessity of dismantling the fishing reel from the rod.

Basically, the device comprises a frame having adjustable opposing sidewalls. Extending between the sidewalls is a shaft which is adapted to fixedly engage the central aperture of a fishing line spool. The shaft is freely rotatable or may be engaged through interfitting gears to a crank for positive rotation therewith. The frame includes clamping means for attaching the device to a fishing rod.

DESCRIPTION OF PREFERRED EMBODIMENTS

Figure 1:
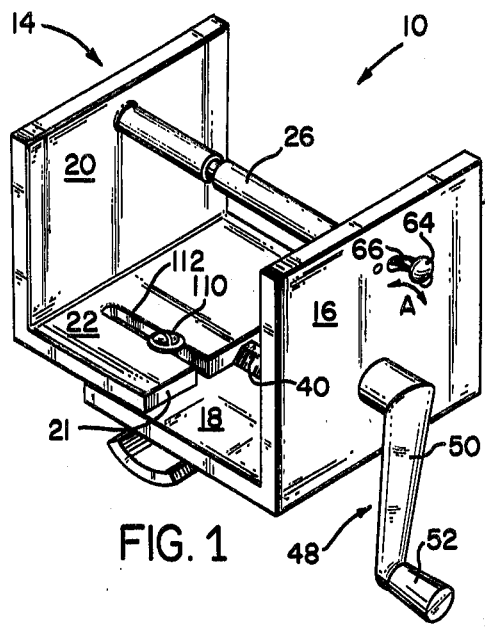
FIG. 1 is a perspective view of the fishing line device of the present invention with the sidewalls set apart the maximum distance.

Referring now to the drawings and more particularly to FIG. 1 thereof, the device of the present invention is shown generally by reference numeral 10. The device comprises a first frame member 12 and a second frame member 14. The first frame member is provided with an upstanding sidewall 16 and a transversely extending bottom portion 18. Similarly, the second frame member comprises an upstanding sidewall member 20 which is provided with a transversely extending bottom member 22.

Figure 4:
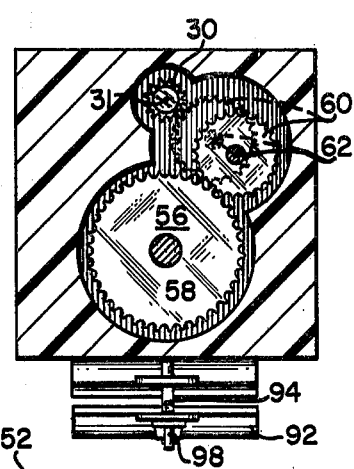
FIG. 4 is a cross-section view taken along lines 4—4 of FIG. 3.
Figure 5:
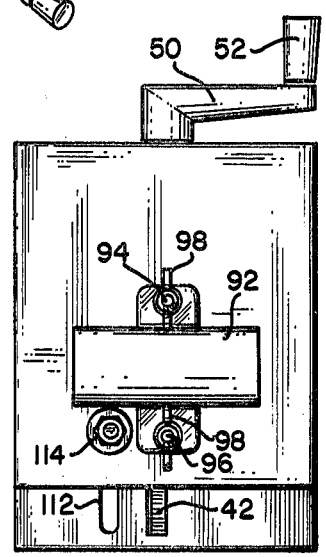
FIG. 5 is a bottom plan view of the device shown in FOG. 2.
Figure 6:
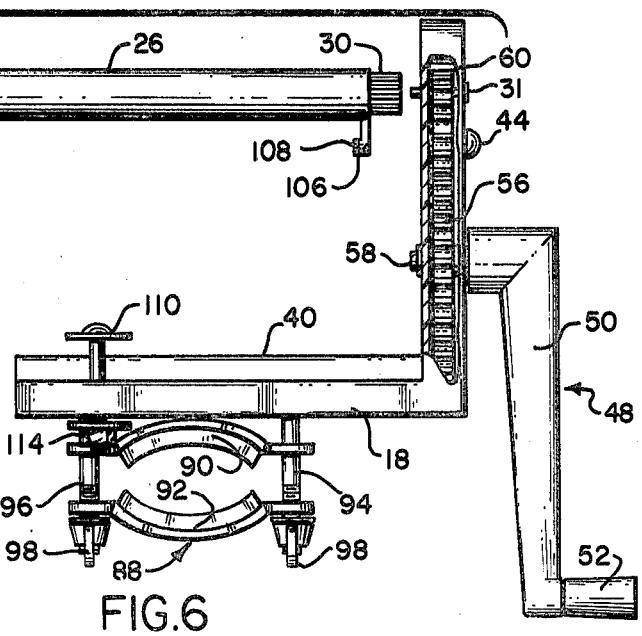
FIG. 6 is an enlarged exploded end elevation view of the device of FIG. 1 showing partial broken-away views of interior portions of each sidewall.

In general, each of the frame members 12 and 14 present an L-shaped configuration and are juxtapositioned so that the respective sidewall members 16 and 20 are spaced apart and parallel with each other. Extending between each of the sidewalls is a shaft 26. As best shown in FIGS. 4 and 6 one end of the shaft shown by reference numeral 30, is journaled into sidewall 16 and includes a toothed gear configuration for a purpose hereinafter discussed.

Sidewall 16 is provided with a crank assembly 48 comprising an L-shaped crank shaft portion 50 having an outwardly extending rotatable knob 52. The crank assembly is configured to facilitate the manual grasping and rotation thereof with one's hand. The crank shaft portion 50 is fixedly connected to a drive means including a drive gear 56 which is mounted for rotation in sidewall 16 by a pin 58. A threaded stud bolt with washer, or rivet or other fasteners well known in the art may be used for this purpose.

The drive gear is connected to a disengagement means which includes an idler gear 60. The idler gear teeth are preferably in continuous engagement with the drive gear teeth. The idler gear is rotatable about a pin means 62 such as that described for pin 58 which, in turn, is connected to an external knob 64. The idler gear may be disengaged by movement of the knob and gear shown by arrow A in FIG. 1 along a closed slot 66 whereby the idler gear may become engaged with the toothed end portion 30 of shaft 26. In this position, shown in phantom in FIG. 4, rotation of the crank will cause the rotation of shaft 26 by drive gear 56 intermeshing with idler gear 60 which meshes with the toothed end 30 of shaft 26. Of course, it will be appreciated that other means well known in the art for engaging and disengaging simple gear assemblies as contemplated in the present invention is within the purview of the present device. For example, it is possible knob 64 may simply be moved axially in and out for engagement between the drive gear 56 and shaft gear 30. It will also be noted that the diameter of pin 62 and slot 66 are sized for frictional engagement to facilitate locking into position the gear 60. Of course, notches, hasps or other known means for locking the gear in position can be used with the present invention.

Referring again to shaft 26 shown best in FIG. 6, a first bearing groove 32 is located at a predetermined minimum distance from the toothed end 30. This distance is slightly greater than the ½-2 inch width of a commercially available spool of fishing line. Adjacent end 31 of the shaft is a second bearing groove 34. This groove is located from end 30 a maximum distance corresponding to large fishing line spools having widths greater than about two inches. It will be appreciated that more than two grooves may be provided and that the annular grooves at least as wide as the width of sidewall 20 and should have a depth sufficient to enable releasable connection with retention means 80.

The retention means 80 comprises an opening 70 through sidewall 20 which is sized to allow the shaft 26 to pass at least up to groove 32. In the embodiment shown in FIG. 6, the opening is provided with opposing ball means 72, 74 which extend partially into the opening. Either one or both of the balls may include spring biasing means 76 which allows displacement of the ball out of the opening and movement of the shaft through the opening. When either of the slots 32,34 reach the opening, the balls will move into the slot and frictionally engage the shaft from further axial movement. Other equivalent engagement means may be used such as spring clips, set screws, cotter pins or the like.

Toothed end 30 of shaft 26 is secured for rotation to sidewall 16 by pin means 31 (similar to pins 58 and 62). In this way, the shaft 26 will be affixed to frame member 12 and adjustment to either of the slots 32,34 will occur by movement of frame member 14. It will be noted, however, that it is within the purview of the present invention that first frame member 12 can be moved relative to second frame member 14 or both members can be moved relative to each other. This may be accomplished by a telescoping engagement of the members or by the provision of appropriate slots in bottom portion 18 to allow movement past bolt members 94 and 96.

Directly adjacent end 30 is spool detention means 106. This may comprise any means which will releasably secure a spool to the shaft 26 and allow its rotation therewith. In the embodiment shown, an L-shaped appendage is affixed to the shaft having a sharp inwardly directed edge 108 for embedding into the sidewall of a spool.

Figure 3:
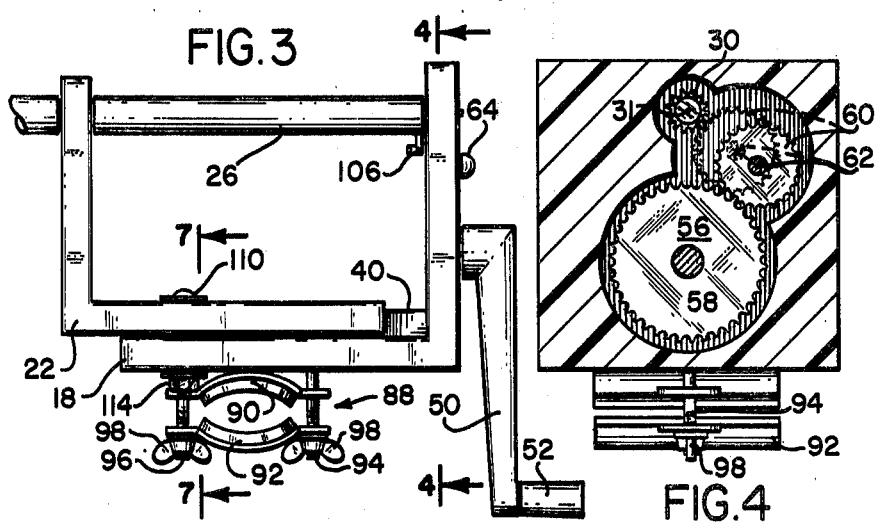
FIG. 3 is an end elevation view of the device of FIG. 2.
Figure 7:
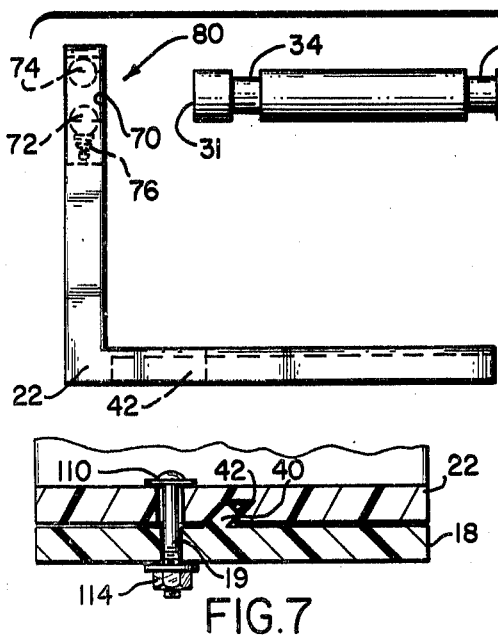
FIG. 7 is a fragmentary cross-section view taken along line 7—7 of FIG. 3.

Referring now to FIGS. 1, 3 and 7 it will be noted that second bottom portion 22 of frame member 14 partially overlies first bottom portion 18 of frame member 12. The two bottom portions engage each other by a guide means comprising a matching slanted projection and corresponding slanted elongated slot. The projection is shown by reference numeral 40 and the slot is shown by reference numeral 42. The slanted connection effectively aligns the frame members and increases the frictional contact area therebetween which enhances the stability of their engagement. It also diminishes the likelihood of possible upward disengagement during heavy winding with the crank means.

To affirmatively secure the frame members from separation, the bottom members are optionally provided with a fastening means. As specifically shown, bottom portion 22 has a slot 112. The slot is open at the inwardly facing end 21 and is adapted to allow a threaded bolt 110 to pass therethrough and also through orifice 19 of bottom portion 18. A matching nut 114 is used to tighten bolt 110 against bottom portion 22 and prevent relative movement between the frame members 12 and 14. Alternately, orifice 19 may be threaded and nut 114 eliminated.

Referring now to FIGS. 3, 4, 5 and 6, clamping means 88 is shown extending from bottom portion 18 of first frame member 12. The clamping means comprises opposing arcuate members 90 and 92 which are engaged with threaded bolt members 94 and 96 and are forced together by rotation of wing nuts or the like shown by reference numerals 98. Although in the preferred embodiment the device 10 of the present invention is clamped closely adjacent to a fishing reel 100, it will be understood that the device may be clamped anywhere along the length of a fishing pole or fishing rod 102.

Figure 2:
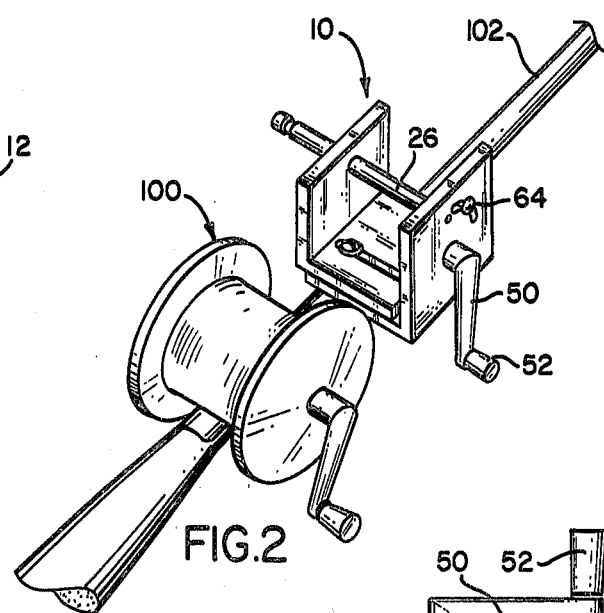
FIG. 2 is a perspective view of the device of FIG. 1 shown mounted on a fishing rod adjacent a fishing reel with the sidewalls set apart the minimum distance.

In describing the assembly of the present invention it is contemplated that the first frame member 12 will be mounted as shown in FIG. 2 to the shaft of the fishing rod 102. A spool, either empty or full of new line as the case may be, will be placed upon shaft 26 which is secured to sidewall 16. The spool will be forced against edge 106 to prevent it from rotating freely about the shaft. Second frame member 14 may now be engaged with frame member 12 by the simultaneous insertion of shaft 26 into opening 70 and engagement of projection 40 with slot 42. Depending on the width of the fishing line spool, the spring-biased ball 72 and/or 74 will engage either of the slots 32 or 34. Once the desired separation is determined and the second side frame member is in place, bolt 110 is inserted through slot 112 and orifice 19 and nut 114 is tightened. With the spool now in place and the widewalls set apart the desired predetermined distance, the line may be fed from reel 100 to the spool and the adjustable gear moved by button 64 into its upper position for engagement with toothed shaft end 30. In this way crank 50 may be revolved and draw line from reel 100. Conversely, the spool on shaft 26 may contain fresh line for feeding to an empty reel. In such a case, the adjustable gear is rotated by button 64 to its lowermost position out of engagement with shaft end 30. Shaft 26 will then rotate freely while reel 100 can be operated to draw line from the spool.

While the invention has been described with respect to a preferred embodiment, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

What is claimed is:

1. A fishing line device for mounting on a fishing rod adjacent a fishing reel comprising:
   a frame assembly having first and second spaced-apart upstanding sidewalls, at least one of which is movable relative to the other, with the first of said sidewalls including drive means connected to a revolving crank mounted upon said first sidewall;
   a shaft adapted for insertion through the central orifice of a fishing line spool extending between said sidewalls wherein a first end of said shaft is journaled for rotation to said first sidewall and connected to said drive means by disengagement means, the second end of said shaft is releasably engaged for rotation to the second sidewall; said frame assembly including guide means for the lateral movement of at least one of said sidewalls and clamping means for mounting the fishing line device on said fishing rod.

2. The device of claim 1 wherein said shaft includes at least two annular bearing grooves located at predetermined positions along the longitudinal extent of said shaft for engagement with said second sidewall.

3. The device of claim 2 wherein said second sidewall includes retention means to releasably retain said shaft for rotation in the second sidewall at said bearing grooves.

4. The device of claim 1 wherein the first end of said shaft is provided with peripheral gear teeth and wherein said drive means includes a drive gear mounted for rotation in said first sidewall by movement of said crank and said disengagement means includes a rotatable idler gear which is in continuous engagement with said drive gear and can be moved to engage said peripheral gear teeth for transmitting rotational motion from said drive gear.

5. The device of claim 1 wherein said upstanding sidewalls are each provided with respective first and second inwardly directed bottom portions.

6. The device of claim 5 wherein said first and second bottom portions are secured from relative movement by a fastening means.

7. The device of claim 2 wherein said shaft includes a spool retention means for securing the fishing line spool to said shaft.

8. The device of claim 5 wherein said bottom portions overlap each other and said guide means comprise an elongated slanted projection extending from one of said bottom portions which engages a corresponding slanted trough formed in the other of said bottom portions.

9. The device of claim 5 wherein said bottom portions telescopingly engage each other.

* * * * *